(12) United States Patent
Gong et al.

(10) Patent No.: US 10,062,874 B2
(45) Date of Patent: Aug. 28, 2018

(54) SEALING ASSEMBLY, METHOD FOR PREPARING SEALING ASSEMBLY, AND BATTERY COMPRISING THE SEALING ASSEMBLY

(71) Applicants: Shenzhen BYD Auto R&D Company Limited, Shenzhen, Guangdong (CN); BYD Company Limited, Shenzhen (CN)

(72) Inventors: Qing Gong, Shenzhen (CN); Xinping Lin, Shenzhen (CN); Xu Zhang, Shenzhen (CN); Yongzhao Lin, Shenzhen (CN); Shurong Xu, Shenzhen (CN)

(73) Assignees: Shenzhen BYD Auto R&D Company Limited, Shenzhen, Guangdong (CN); BYD Company Limited, Pingshan, Shenzhen, Guangdong (CN)

( * ) Notice: Subject to any disclaimer, the term of this patent is extended or adjusted under 35 U.S.C. 154(b) by 326 days.

(21) Appl. No.: 14/368,929

(22) PCT Filed: Dec. 26, 2012

(86) PCT No.: PCT/CN2012/087585
§ 371 (c)(1),
(2) Date: Jun. 26, 2014

(87) PCT Pub. No.: WO2013/097727
PCT Pub. Date: Jul. 4, 2013

(65) Prior Publication Data
US 2014/0356701 A1  Dec. 4, 2014

(30) Foreign Application Priority Data
Dec. 27, 2011 (CN) .......................... 2011 1 0444125

(51) Int. Cl.
*H01M 2/08* (2006.01)
*H01M 2/06* (2006.01)
(Continued)

(52) U.S. Cl.
CPC ............... *H01M 2/08* (2013.01); *B23K 1/008* (2013.01); *B23K 1/19* (2013.01); *C04B 37/026* (2013.01);
(Continued)

(58) Field of Classification Search
None
See application file for complete search history.

(56) References Cited

U.S. PATENT DOCUMENTS 4,508,797 A * 4/1985 Knoedler .............. H01M 2/065
429/181
4,902,867 A * 2/1990 Haramaki .............. H01R 4/026
219/85.18
(Continued)

FOREIGN PATENT DOCUMENTS

CN 201181721 Y 1/2009
CN 101626088 A 1/2010
(Continued)

OTHER PUBLICATIONS

International Search Report and Written Opinion for Application No. PCT/CN2012/087585 dated Mar. 21, 2013.

*Primary Examiner* — Sarah A. Slifka
*Assistant Examiner* — Haroon S. Sheikh
(74) *Attorney, Agent, or Firm* — David D. Brush; Westman, Champlin & Koehler, PA

(57) ABSTRACT

A sealing assembly, a method of preparing the sealing assembly and a battery are provided. The sealing assembly comprises a metal ring having a mounting hole therein; a ceramic ring having a connecting hole therein and disposed
(Continued)

in the mounting hole; and a core column disposed in the connecting hole, wherein at least one of an inner circumferential wall surface of the metal ring, an outer circumferential wall surface of the ceramic ring, an inner circumferential wall surface of the ceramic ring and an outer circumferential wall surface of the core column is configured as an inclined surface, and an inclination angle of the inclined surface relative to a vertical plane is about 1 degree to about 45 degrees.

11 Claims, 1 Drawing Sheet

(51) Int. Cl.
  *H01M 2/30*   (2006.01)
  *B23K 1/008*  (2006.01)
  *B23K 1/19*   (2006.01)
  *C04B 37/02*  (2006.01)
  *H01G 9/20*   (2006.01)
  *B23K 101/38* (2006.01)

(52) U.S. Cl.
  CPC ........... *H01M 2/065* (2013.01); *H01M 2/307* (2013.01); *B23K 2201/38* (2013.01); *C04B 2237/121* (2013.01); *C04B 2237/122* (2013.01); *C04B 2237/123* (2013.01); *C04B 2237/124* (2013.01); *C04B 2237/343* (2013.01); *C04B 2237/348* (2013.01); *C04B 2237/402* (2013.01); *C04B 2237/403* (2013.01); *C04B 2237/405* (2013.01); *C04B 2237/407* (2013.01); *C04B 2237/52* (2013.01); *H01G 9/2077* (2013.01); *Y10T 29/4911* (2015.01)

(56) References Cited

U.S. PATENT DOCUMENTS

| 5,013,612 A * | 5/1991 | Hunt ................ B23K 35/32 |
| | | 428/469 |
| 6,335,117 B1 * | 1/2002 | Yoshida ............. H01M 2/065 |
| | | 429/180 |
| 7,575,829 B1 * | 8/2009 | Nakahara ........... H01M 2/0426 |
| | | 429/163 |
| 2003/0143460 A1 * | 7/2003 | Yoshida ............. H01M 2/06 |
| | | 429/181 |
| 2009/0011331 A1 | 1/2009 | Stringer et al. |
| 2012/0003528 A1 * | 1/2012 | Kusukawa ......... H01M 2/0212 |
| | | 429/179 |

FOREIGN PATENT DOCUMENTS

| GB | 1586073 A | 3/1981 |
| JP | 55117864 | 9/1980 |
| JP | S5931555 A | 2/1984 |

* cited by examiner

SEALING ASSEMBLY, METHOD FOR PREPARING SEALING ASSEMBLY, AND BATTERY COMPRISING THE SEALING ASSEMBLY

CROSS-REFERENCE TO RELATED APPLICATIONS

The present application is a national phase entry under 35 U.S.C. § 371 of International Application No. PCT/CN2012/087585, filed Dec. 26, 2012, which claims priority from Chinese Application No. 201110444125.X filed Dec. 27, 2011, all of which are hereby incorporated herein by reference.

Field

The present disclosure relates to a sealing assembly, method for preparing the sealing assembly, and a battery comprising the sealing assembly.

Background

Currently, according to the packaging material used, the package of a battery may be divided into plastic package, glass package and ceramic package.

The plastic package can not meet requirements of storage battery and reliable power battery which may have a long service life (e.g. longer than 20 years). The glass package may be corroded after long-term usage and storage due to direct contacting thereof with the electrolyte solution, thus reducing the insulating property of the glass and causing leakage.

The ceramic package is popular in the battery packing field. FIG. 1 shows a conventional sealing assembly mainly consisting of a core column 3' configured as a current collector, a metal ring 1' connected to a battery shell and a ceramic ring 2' configured to connect the core column 3' with the metal ring 1' and insulate the core column 3' from the metal ring 1'. The metal ring 1' has a central mounting hole therein, and the ceramic ring 2' has a central connecting hole therein, such that the ceramic ring 2' is disposed in the central mounting hole of the metal ring 1', and the core column 3' is disposed in the central connecting hole of the ceramic ring 2'. The ceramic ring 2' is soldered to the core column 3' through a solder material to form a soldering layer 4' therebetween, and the metal ring 1' is soldered to the ceramic ring 2' through a solder material to form a soldering layer 5' therebetween.

However, with the conventional sealing assembly, the contact surfaces between the metal ring and the ceramic ring as well as between the ceramic ring and the core column are perpendicular to the horizontal plane and the soldering process is performed on a circumferential surface perpendicular to the horizontal plane. These results in some shortcomings, for example, the dimensional accuracy of the sealing assembly should be high so that the cost is high; the components of the sealing assembly should be kept in homocentric and fixed by clamps during soldering; and each of the gap widths between the metal ring and the ceramic ring and between the ceramic ring and the core column should be suitable and consistent. The gap width is hard to control so that the solder material can not sufficiently fill the gap. Therefore, the air impermeability of the sealing assembly is poor.

SUMMARY

An object of the present disclosure is to solve at least one of the problems existing in the prior art to at least some extent.

Embodiments of a first aspect of the present disclosure provide a sealing assembly, comprising: a metal ring having a mounting hole therein; a ceramic ring having a connecting hole therein and disposed in the mounting hole; and a core column disposed in the connecting hole, at least one of an inner circumferential wall surface of the metal ring, an outer circumferential wall surface of the ceramic ring, an inner circumferential wall surface of the ceramic ring and an outer circumferential wall surface of the core column is configured as an inclined surface, and an inclination angle of the inclined surface relative to a vertical plane is about 1 degree to about 45 degrees.

Embodiments of a second aspect of the present disclosure provide a method of preparing a sealing assembly, comprising steps of: preparing a metal ring having a mounting hole therein, a ceramic ring having a connecting hole therein, and a core column; disposing the core column in the connecting hole of the ceramic ring; and disposing the ceramic ring in the mounting hole of the metal ring, at least one of an inner circumferential wall surface of the metal ring, an outer circumferential wall surface of the ceramic ring, an inner circumferential wall surface of the ceramic ring and an outer circumferential wall surface of the core column is configured as an inclined surface, and an inclination angle of the inclined surface relative to a vertical plane is about 1 degree to about 45 degrees.

Embodiments of a third aspect of the present disclosure provide a battery, comprising: a shell having at least one open end; an electrode core and electrolyte solution received in the shell; and at least one sealing assembly configured to seal the at least one open end of the shell, wherein the sealing assembly is any one of mentioned above, and the metal ring of the sealing assembly is connected with the shell and the core column is connected with the electrode core.

DETAILED DESCRIPTION

Figure 1:
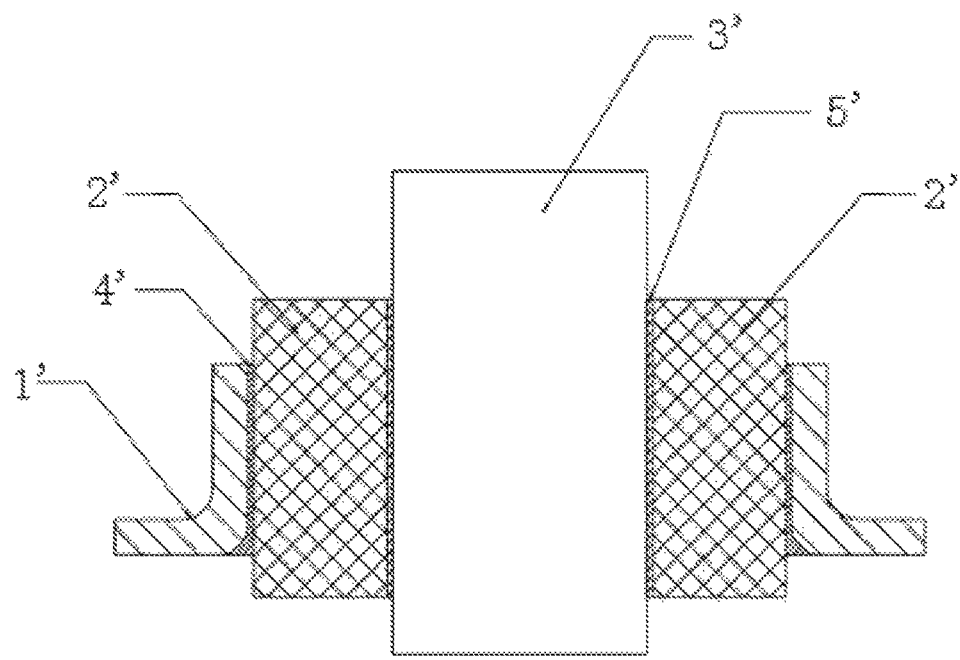
FIG. 1 is a schematic view of a conventional sealing assembly.

In the specification, terms such as "central", "horizontal", "vertical", "inner", "outer" as well as derivative thereof (e.g., "horizontally", "vertically", etc.) should be construed to refer to the orientation as then described or as shown in the drawings under discussion. These relative terms are for convenience of description and do not require that the present disclosure be constructed or operated in a particular orientation. Terms concerning "connected", refer to a relationship wherein structures are secured or attached to one another either directly or indirectly through intervening structures, unless expressly described otherwise.

A sealing assembly according to embodiments of the present disclosure comprises: a metal ring having a mounting hole therein; a ceramic ring having a connecting hole therein and disposed in the mounting hole; and a core column disposed in the connecting hole, at least one of an inner circumferential wall surface of the metal ring, an outer circumferential wall surface of the ceramic ring, an inner circumferential wall surface of the ceramic ring and an outer circumferential wall surface of the core column is configured as an inclined surface, and an inclination angle of the inclined surface relative to a vertical plane is about 1 degree to about 45 degrees.

With the sealing assembly according to embodiments of the present disclosure, at least one of the inner circumferential wall surface of the metal ring, the outer circumferential wall surface of the ceramic ring, the inner circumferential wall surface of the ceramic ring and the outer circumferential wall surface of the core column (which may also be referred as soldering or jointing surface of the sealing assembly) is configured as an inclined surface which has an inclination angle of about 1 degree to about 45 degrees relative to the vertical plane, so that the metal ring and the ceramic ring may be well matched each other, and the ceramic ring and the core column may be well matched each other. The gap widths between the metal ring and the ceramic ring and between the ceramic and the core column may be adjusted by utilizing deadweight thereof during soldering to ensure that the molten solder material may be full filled with the solder material, thus improving the soldering quality and soldering yield rate. Moreover, by changing the shape of soldering surface of the sealing assembly, the welding area is increased and the peel strength of the soldering is improved. Furthermore, the sealing assembly may have a stable structure, high air impermeability and peel strength.

Advantageously, the inner circumferential wall surface of the metal ring and the outer circumferential wall surface of the ceramic ring form a first pair of jointing surfaces, the inner circumferential wall surface of the ceramic ring and the outer circumferential wall surface of the core column form a second pair of jointing surfaces, at least one pair of the first and second pairs of jointing surfaces is configured as the inclined surface.

In some embodiments, both the first and the second pairs of the jointing surfaces are configured as the inclined surface.

Preferably, the inclination angle is about 2 degrees to about 10 degrees.

Advantageously, the ceramic ring is made of alumina ceramic, zirconia ceramics, or alumina-zirconia composite ceramic. The metal ring is made of Al—Mg alloy or Al—Mn alloy.

In some embodiments, a first soldering layer is disposed between the inner circumferential wall surface of the metal ring and the outer circumferential wall surface of the ceramic ring.

Preferably, the first soldering layer is formed by an Al-based solder material comprising Al and at least one of Si and Mg.

In some embodiments, a second soldering layer is disposed between the inner circumferential wall surface of the ceramic ring and the outer circumferential wall surface of the core column.

In some embodiments, the sealing assembly is configured as a sealing assembly for a positive electrode of a battery, the core column is made of Al, Ti, or Al—Ti alloy, and the second soldering layer is formed by an Al-based solder material or a Ti-based solder material. Preferably, the Ti-based solder material comprises Ti, and at least one of Zr, Ni, and Cu.

In some embodiments, the sealing assembly is configured as a sealing assembly for a negative electrode of a battery, the core column is made of at least one of Cu, Ni, Ti and an alloy thereof, and the second soldering layer is formed by a Cu—P based solder material, a Ni—P based solder material or a Ti-based solder material. Preferably, the Ti-based solder material comprises Ti, and at least one of Zr, Ni, and Cu.

A method for preparing a sealing assembly according to embodiments of the present disclosure comprises steps of: preparing a metal ring having a mounting hole therein, a ceramic ring having a connecting hole therein, and a core column, disposing the core column in the connecting hole of the ceramic ring; and disposing the ceramic ring in the mounting hole of the metal ring, wherein at least one of an inner circumferential wall surface of the metal ring, an outer circumferential wall surface of the ceramic ring, an inner circumferential wall surface of the ceramic ring and an outer circumferential wall surface of the core column is configured as an inclined surface, and an inclination angle of the inclined surface relative to a vertical plane is about 1 degree to about 45 degrees.

In some embodiments, the inner circumferential wall surface of the metal ring and the outer circumferential wall surface of the ceramic ring form a first pair of jointing surfaces, the inner circumferential wall surface of the ceramic ring and the outer circumferential wall surface of the core column form a second pair of jointing surfaces, at least one pair of the first and second pairs of jointing surfaces is configured as the inclined surface.

Advantageously, both the first and second pairs of the jointing surfaces are configured as the inclined surface.

Preferably, the inclination angle is about 2 degrees to about 10 degrees.

Preferably, the core column is mounted in the connecting hole of the ceramic ring via a first soldering process. Moreover, the first soldering process is performed at a temperature lower than a melting point of the core column for about 1 minute to about 10 minutes under vacuum or an inert gas.

In some embodiments, the ceramic ring is mounted in the mounting hole of the metal ring via a second soldering process. Preferably, the second soldering process is performed at a temperature of about 580 to about 630° C. for about 1 minute to about 5 minutes under vacuum or an inert gas. Moreover, the second soldering process is performed by using a solder material. Preferably, the solder material comprises Al, and at least one of Si and Mg.

A battery according to embodiments of the present disclosure comprises: a shell having at least one open end; an electrode core and electrolyte solution received in the shell; and at least one sealing assembly configured to seal the at least one open end of the shell, wherein the sealing assembly is any one of above mentioned sealing assembly, and the metal ring of the sealing assembly is connected with the shell and the core column is connected with the electrode core.

The sealing assembly according to embodiments of the present disclosure will be described in details with reference to FIG. 2. In the specification, term "vertical plane" means a plane which is perpendicular to the horizontal plane. For example, in FIG. 2, the horizontal plane is perpendicular to the axial direction of the core column and the vertical plane is parallel to the axial direction.

In some embodiments, the sealing assembly may be used for sealing a battery, more particularly for sealing a lithium ion battery, more particularly for sealing a high-power lithium ion battery such as a power lithium ion battery and an energy storage lithium ion battery. As well known by one of ordinary skill in the art, the lithium ion battery comprises a shell having at least one open end, a core disposed in the shell and electrolyte solution received in the shell. In order to avoid leaking of the electrolyte solution, a sealing assembly is used for sealing the open end. The shell is generally made of Al or steel and used for receiving the core and the electrolyte solution therein. The core may be formed by laminating an anode sheet, a separator and a cathode sheet in turn and then coiling them. The construction of the core and method for preparing the core are well known for one of ordinary skill in the art, so that the detailed descriptions thereof are omitted.

Figure 2:
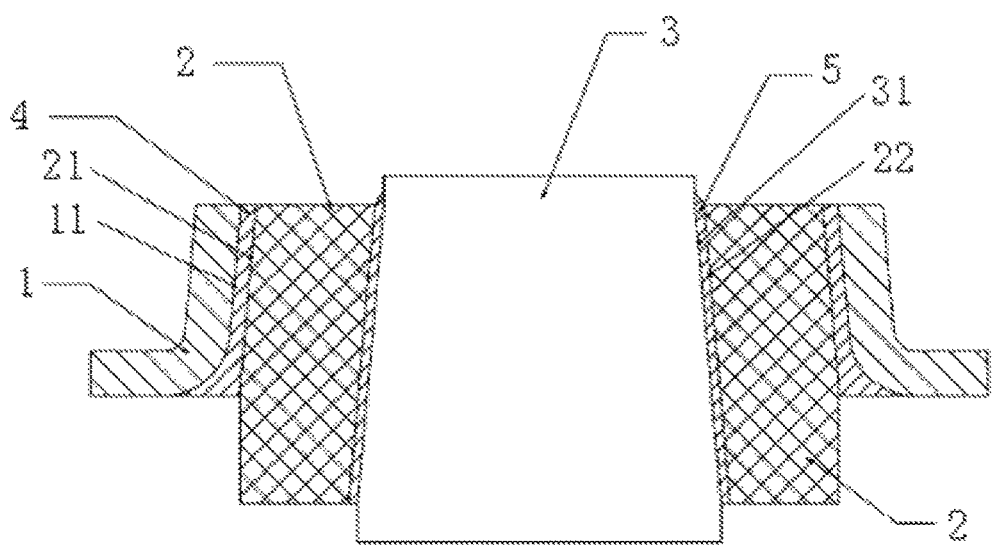
FIG. 2 is a schematic view of a sealing assembly according to embodiments of the present disclosure.

As shown in FIG. 2, the sealing assembly according to embodiments of the present disclosure comprises a metal ring 1 having a mounting hole therein; a ceramic ring 2 having a connecting hole therein and disposed in the mounting hole; and a core column 3 disposed in the connecting hole. At least one of an inner circumferential wall surface 11 of the metal ring 1, an outer circumferential wall surface 21 of the ceramic ring 2, an inner circumferential wall surface 22 of the ceramic ring 2 and an outer circumferential wall surface 31 of the core column 3 is configured as an inclined surface, and an inclination angle of the inclined surface relative to a vertical plane is about 1 degree to about 45 degrees. In addition, the above wall surfaces may also be referred as soldering or jointing surface in the description.

In some embodiments, a first soldering layer 4 is disposed between the inner circumferential wall surface11 of the metal ring 1 and the outer circumferential wall surface 21 of the ceramic ring 2 for connecting the ceramic ring 2 and the metal ring 1. A second soldering layer 5 is disposed between the inner circumferential wall surface 22 of the ceramic ring 2 and the outer circumferential wall surface 31 of the core column 3 to connect the ceramic ring 2 and the core column 3. The first and second soldering layers 4, 5 may be formed by solder materials.

Preferably, the inclination angle is about 2 degrees to about 10 degrees. The preferable inclination angle may increase the soldering area and improve the peel strength of soldering layers, thus realizing good connection of the ceramic ring 2 with the metal ring 1 as well as the core column 3 and facilitating the performing of the soldering process.

In some embodiments, preferably, all of the inner circumferential wall surface 11 of the metal ring 1, the outer circumferential wall surface 21 of the ceramic ring 2, the inner circumferential wall surface 22 of the ceramic ring 2 and the outer circumferential wall surface 31 of the core column 3 are the inclined surfaces having an inclination angle of about 1 degree to about 45 degrees relative to the vertical plane. More preferably, the inclination angle of the inner circumferential wall surface 11 of the metal ring 1 is identical with that of the outer circumferential wall surface 21 of the ceramic ring 2, and the inclination angle of the inner circumferential wall surface 22 of the ceramic ring 2 is identical with that of the outer circumferential wall surface 31 of the core column 3. One of ordinary skill in the art can understand that the inclination angle of the outer circumferential wall surface 21 of the ceramic ring 2 may not be identical with that of the inner circumferential wall surface thereof.

By way of example, the inner circumferential wall surface 11 of the metal ring 1 and the outer circumferential wall surface 21 of the ceramic ring 2 form a first pair of jointing surfaces (i.e. soldering or jointing surfaces), the inner circumferential wall surface 22 of the ceramic ring 2 and the outer circumferential wall surface 31 of the core column 3 form a second pair of jointing surfaces. Preferably, at least one pair of the first and second pairs of jointing surfaces is configured as the inclined surface. More preferably, both the first and second pairs of the jointing surfaces are configured as the inclined surface.

It should be noted that the inclination angle of the first pair of jointing surfaces relative to the vertical plane may be differ from that of the second pair of jointing surfaces relative to the vertical plane, as long as the inclination angle is about 1 degree to about 45 degrees.

Particularly, the inner circumferential wall surface 11 of the metal ring 1 may match the outer circumferential wall surface 21 of the ceramic ring 2. Both the inner circumferential wall surface 11 of the metal ring 1 and the outer circumferential wall surface 21 of the ceramic ring 2 are inclined surfaces, and the inclination angle thereof is about 1 degree to about 45 degrees, preferably about 2 degrees to about 10 degrees. A first soldering layer 4 is formed between the inner circumferential wall surface11 of the metal ring 1 and the outer circumferential wall surface 21 of the ceramic ring 2 to connect the ceramic ring 2 with the metal ring 1.

In some embodiments, the metal ring 1 may be made of Al—Mg alloy or Al—Mn alloy. The metal ring 1 may be soldered to the shell of a battery for sealing the open end of the shell. Certainly, the metal ring 1 and the shell may be made of the same material such as aluminum or steel. The metal ring 1 is connected to the shell of a battery such that the sealing assembly may be tightly coupled with the battery to seal the battery.

The metal ring 1 may have a mounting hole therein, and the mounting hole has a radial dimension (e.g. diameter) matched the external radial dimension (e.g. diameter) of the ceramic ring 2, and the ceramic ring 2 is disposed in the mounting hole. A gap is left between the outer circumferential wall surface 21 of the ceramic ring 2 and the inner circumferential wall surface11 of the metal ring 1 for filling a solder material therein to form the first soldering layer 4 by a soldering process, thus connecting the metal ring 1 and the ceramic ring 2.

In some embodiments, the ceramic ring 2 is used to achieve an insulated connection between the metal ring 1 and the core column 3. The ceramic ring 2 may be made of alumina ceramic, zirconia ceramics, or alumina-zirconia composite ceramic. The metal ring 1 is soldered to the ceramic ring 2 by a solder material to form the first soldering layer 4. The first soldering layer 4 is formed by an Al-based solder material comprising Al and at least one of Si and Mg, such as Al—Si solder material, Al—Mg solder material or Al—Si—Mg solder material.

The core column 3 is connected and thereby fixed to the metal ring 1 by means of the ceramic ring 2, and the core column 3 is insulated from the metal ring 1. The ceramic ring 2 may have a connecting hole therein, and at least one of the inner circumferential wall surface of the connecting hole and the outer circumferential wall surface 21 of the ceramic ring 2 is the inclined surface, and the inclination angle of the inclined surface relative to the vertical plane is about 1 degree to about 45 degrees.

In some embodiments, the ceramic ring 2 may be made of alumina ceramic, zirconia ceramic, or alumina-zirconia composite ceramic. Such ceramic rings may have a thermal expansion coefficient close to that of a metal (For example, the alumina ceramic has a thermal expansion coefficient of about 7.5 ppm/K; the zirconia ceramic has a thermal expansion coefficient of about 10.5 ppm/K), which improves thermal shock resistance performance of the sealing assembly and increase service life thereof.

Preferably, the ceramic ring 2 may be metallized by means of Mo—Mn metallizing or chemical nickel plating.

The ceramic ring 2 was plated with molybdenum manganese or nickel. The Mo—Mn metallizing and chemical nickel plating are well known in the art and detailed descriptions are omitted.

In some embodiments, the outer circumferential wall surface 31 of the core column 3 may match the inner circumferential wall surface 22 of the ceramic ring 2. Both the outer circumferential wall surface 31 of the core column 3 and the inner circumferential wall surface 22 of the ceramic ring 2 are inclined surfaces, and the inclination angles thereof are about 1 degree to about 45 degrees, preferably about 2 degrees to about 10 degrees. A second soldering layer 5 is formed between the outer circumferential wall surface 31 of the core column 3 and the inner circumferential wall surface 22 of the ceramic ring 2 by a solder material to connect the ceramic ring 2 and core column 3.

As one of ordinary skill in the art will readily understand, if the sealing assembly is configured as a sealing assembly for a positive electrode of a battery, the core column 3 may be made of at least one of Al, Ti, and the second soldering layer 5 may be formed by an Al-based solder material or a Ti-based solder material. The Al-based solder material comprises Al and at least one of Si and Mg, and the Ti-based solder material comprises Ti, and at least one of Zr, Ni, and Cu.

If the sealing assembly is configured as a sealing assembly for a negative electrode of a battery, the core column 3 may be made of at least one of Cu, Ni and Ti and an alloy thereof, and the second soldering layer 5 may be formed by a Cu—P based solder material, a Ni—P based solder material or a Ti-based solder material. The Ti-based solder material may comprise Ti, and at least one of Zr, Ni, and Cu.

Preferably, the core column 3 may be made of Ti or Ti alloy. The Ti alloy may be a conventional alloy, such as Ti—Al alloy, Ti—Mo alloy, Ti—Pd alloy, Ti—Fe alloy, Ti—Ni alloy. The core column 3 made of Ti or Ti alloy may have a thermal expansion coefficient (of about 8-10 ppm/K) lower than that of Al, Al alloy, Cu or Cu alloy, which overcomes the discrepancy of thermal expansion coefficient between the ceramic ring 2 and the core column 3 such that the thermal expansion coefficient of the ceramic ring 2 and the core column 3 may well matched each other. For example, the thermal expansion coefficient ($\alpha_2$) of Al is about 23.2 ppm/K. More advantageously, the core column 3 made of Ti or Ti alloy may be soldered to the ceramic ring 2 via a Ti-based solder material. The Ti-based solder material comprises Ti, and at least one of Zr, Ni, and Cu. The Ti-based solder material doesn't comprise components which may react with Li-ion of the electrolyte solution during charge or discharge; the reaction may result in lithium-insertion or lithium-extraction during charging or discharging. Therefore, the core column 3 made of Ti or Ti alloy may have a relatively high electrochemical corrosion resistance, thus improving the service life of the sealing assembly.

With the sealing assembly according to embodiments of the present disclosure, at least one of an inner circumferential wall surface 11 of the metal ring 1, an outer circumferential wall surface 21 of the ceramic ring 2, an inner circumferential wall surface 22 of the ceramic ring 2 and an outer circumferential wall surface 31 of the core column 3 is inclined to have an inclination angle of about 1 degree to about 45 degrees, preferably about 2 degrees to about 10 degrees, relative to the vertical plane, so that the metal ring 1, the ceramic ring 2 and the core column 3 may well connected with each other. Each of the gap widths between the metal ring 1 and the ceramic ring 2 and between the ceramic ring 2 and the core column 3 may be adjusted by utilizing their deadweight during soldering respectively, to ensure that the molten solder material may sufficiently fill the gaps, thus avoiding incomplete filling of the gaps due to the non-uniform or improper gap width. Therefore, the soldering quality and yield rate may be enhanced greatly. Moreover, the shape of soldering surface of the sealing assembly is changed, thus increasing the soldering area and improving the peel strength. The sealing assembly according to embodiments of the present disclosure may have a stable structure, a high air impermeability and high peel strength.

A method for preparing a sealing assembly is provided according to embodiments of the present disclosure will be described. The method comprising steps of:

Step 1, preparing a metal ring 1 having a mounting hole therein, a ceramic ring 2 having a connecting hole therein, and a core column 3. At least one of an inner circumferential wall surface 11 of the metal ring 1, an outer circumferential wall surface 21 of the ceramic ring 2, an inner circumferential wall surface 22 of the ceramic ring 2 and an outer circumferential wall surface 31 of the core column 3 is configured as an inclined surface having an inclination angle of about 1 degree to about 45 degrees relative to a vertical plane.

In Step 1, the metal ring 1, the ceramic ring 2 and the core column 3 may be prepared via conventional methods. For example, a semifinished product of ceramic ring 2 may be prepared via dry pressing, and then the semifinished product may be boiled-off and sintered to form the ceramic ring 2. The boiled-off may be carried out under a temperature of about 600° C. to about 700° C. for about 2 hours to about 3 hours; and the sintering may be carried out under a temperature of about 1500° C. to about 1800° C. for about 2 hours to about 10 hours. The metal ring 1 and the core column 3 may be machined via a conventional machine tool. At least one of the inner circumferential wall surface 11 of the metal ring 1, the outer circumferential wall surface 21 of the ceramic ring 2, the inner circumferential wall surface 22 of the ceramic ring 2 and the outer circumferential wall surface 31 of the core column 3 may be formed as the inclined surface during the formation of the metal ring 1, the ceramic ring 2 and the core column 3, and the inclination angle of the inclined surface relative to the vertical plane may be about 1 degree to about 45 degrees.

Particularly, the inner circumferential wall surface 11 of the metal ring 1 may match the outer circumferential wall surface 21 of the ceramic ring 2 to form a first pair of jointing surfaces, and the first pair of jointing surfaces may be inclined surfaces. The inclination angle of the first pair of jointing surfaces relative to the vertical plane may be about 1 degree to about 45 degrees, preferably about 2 degrees to about 10 degrees. The outer circumferential wall surface 31 of the core column 3 may match the inner circumferential wall surface 22 of the ceramic ring 2 to form a second pair of jointing surfaces, and the second pair of jointing surfaces may be inclined surfaces. The inclination angle of the second pair of jointing surfaces relative to the vertical plane may be about 1 degree to about 45 degrees, preferably about 2 degrees to about 10 degrees. Therefore, the metal ring 1, the ceramic ring 2 and the core column 3 may be connected with each other suitably. The gap widths between the metal ring 1 and the ceramic ring 2 and between the ceramic ring 2 and the core column 3 may be adjusted by utilizing their deadweight respectively, thus reducing the requirement of concentricity and accuracy of the gaps during soldering. The metal ring 1, the ceramic ring 2 and the core column 3 matches with each other very well and don't need clamps to fix them, thus reducing costs and saving time.

Step 2, disposing the core column 3 in the connecting hole of the ceramic ring 2, and disposing the ceramic ring 2 in the mounting hole of the metal ring 1 to obtain a sealing assembly.

In step 2, the core column 3 is disposed in the connecting hole of the ceramic ring 2, and a soldering piece is disposed between the core column 3 and the ceramic ring 2. The outer circumferential wall surface 31 of the core column 3 is soldered to the inner circumferential wall surface 22 of the ceramic ring 2 via a first solder process to form a first soldering layer therebetween. The first solder process, which is well known by those skilled in the art, may be carried out as the following: using a metal material, whose melting point is lower than the base metal of the core column 3 and the ceramic ring 2, as the solder material; heating the core column 3, the ceramic ring 2 and the solder material to a temperature higher than the melting point of the solder material and lower than melting point of the base metal; utilizing the molten and liquid solder material to soak the base metal, so that the solder material may be filled in the gap between the core column 3 and the ceramic ring 2. In some embodiments, the first solder process may be performed at a temperature higher than the melting point of the solder material and lower than the melting point of the core column 3 for about 1 minute to about 10 minutes under vacuum or an inert gas.

If the sealing assembly is configured as a sealing assembly for a positive electrode of a battery, the core column 3 may be made of at least one of Al, Ti, and the first soldering layer is formed by an Al-based solder material or a Ti-based solder material.

If the sealing assembly is configured as a sealing assembly for a negative electrode of a battery, the core column 3 may be made of at least one of Cu, Ni, Ti, and the first soldering layer is formed by a Cu—P based solder material, a Ni—P based solder material or a Ti-based solder material.

For example, if the core column 3 is made of Ti or Ti alloy and the first soldering layer is formed by a Ti-based solder material or a Ni—P based solder material, the first solder process may be performed at a temperature of about 950° C. to about 1000° C. for about 1 minute to about 5 minutes under vacuum or an inert gas.

If the core column 3 is made of Al or Al alloy and the first soldering layer is formed by an Al-based solder material, the first solder process may be performed at a temperature of about 580° C. to about 630° C. for about 1 minute to about 5 minutes.

If the core column 3 is made of Cu or Cu alloy and the first soldering layer is formed by a Cu—P based solder material or a Ni—P based solder material, the first solder process may be performed at a temperature of about 950° C. to about 1000° C. for about 1 minute to about 5 minutes. If the core column 3 is made of Ni or Ni alloy and the first soldering layer is formed by a Ni—P based solder material, the first solder process may be performed at a temperature of about 950° C. to about 1000° C. for about 1 minute to about 5 minutes.

During performing of the first solder process, the inner circumferential wall surface 22 of the ceramic ring 2 and the outer circumferential wall surface 31 of the core column 3 may be inclined surfaces having an inclination angle of about 1 degree to about 45 degrees relative to the vertical plane. The gap width between the ceramic ring 2 and the core column 3 may be adjusted by utilizing their deadweight to ensure that the molten solder material may flow smoothly and the gap may be sufficiently filled with the solder material, thus avoiding incomplete filling of the solder material in the gap due to the non-uniform or improper gap width. Therefore, the soldering quality and yield rate may be enhanced greatly. A first soldering layer 5 may be formed between the inner circumferential wall surface 22 of the ceramic ring 2 and the outer circumferential wall surface 31 of the core column 3 after soldering; the ceramic ring 2 is connected with the core column 3 through the first soldering layer 5.

In step 2, the metal ring 1 is soldered to the ceramic ring 2 via a second solder process. The second solder process may be carried out at a temperature lower than the melting point of the based metal. The solder material may be Al—Si alloy, Al—Mg alloy, or Al—Si—Mg alloy which may be suitable for soldering ceramic and Al alloy. In order to improve the soldering effect, preferably, the solder material is Al—Si—Mg alloy, in which the content of Si is about 0 to about 12 wt %, the content of Mg is about 0 to about 12 wt %, and the rest is Al. The second solder process may be carried out at a temperature of about 580° C. to about 630° C. for about 1 minute to about 5 minutes under vacuum or an inert gas. Preferably, the inert gas is nitrogen.

During the second solder process for soldering the metal ring 1 and the ceramic ring 2, the inner circumferential wall surface 11 of the metal ring 1 and the outer circumferential wall surface 21 of the ceramic ring 2 may be inclined surfaces having an inclination angle of about 1 degree to about 45 degrees relative to the vertical plane. The gap width between the metal ring 1 and the ceramic ring 2 may be regulated by utilizing their deadweight to ensure that the molten solder material may flow smoothly and the gap may be sufficiently filled with the solder material, thus avoiding incomplete filling of the solder material in the gap due to the non-uniform or improper gap width. Therefore, the soldering quality and yield rate may be enhanced greatly. A second soldering layer 4 may be formed between the inner circumferential wall surface 11 of the metal ring 1 and the outer circumferential wall surface 21 of the ceramic ring 2 after soldering, and the ceramic ring 2 is connected with the metal ring 1 through the second soldering layer 4.

It should be noted that, because the second solder process for soldering the core column 3 and the ceramic ring 2 is carried out at a temperature higher than that at which the first soldering process for soldering the ceramic ring 2 and the metal ring 1, the second soldering process should be carried out before the second soldering process.

A battery according to embodiments of the present disclosure will be described below.

The battery may comprise a shell having at least one open end; an electrode core and electrolyte solution received in the shell; and at least one sealing assembly configured to seal the at least one open end of the shell, in which the sealing assembly may be any one described above, and the metal ring of the sealing assembly is connected with the shell and the core column is connected with the electrode core.

In order to explain the assembling of the sealing assembly, by way of example and without limitation, a battery having a shell with two open ends is provided. A first sealing assembly is disposed for sealing the positive electrode of the battery, and a second sealing assembly is disposed for sealing the negative electrode of the battery. The two sealing assemblies are disposed at the two open ends of the shell. The metal rings 1 of the two sealing assemblies are soldered to the shell respectively, and the core columns 3 of the two sealing assemblies are connected to the core of the battery respectively.

An enclosed space is defined by the two sealing assemblies and the shell after the two sealing assemblies are fixed. A core and electrolyte solution are received in the enclosed space (for example, the electrolyte solution is injected into the enclosed space through an injecting hole formed in the metal ring 1, which is known by one of ordinary skill in the art). The core columns of the two sealing assemblies may be used as electrodes of the battery for connecting external electric equipment thereto.

As mentioned above, at least one of an inner circumferential wall surface 11 of the metal ring 1, an outer circumferential wall surface 21 of the ceramic ring 2, an inner circumferential wall surface 22 of the ceramic ring 2 and an outer circumferential wall surface 31 of the core column 3 is configured as an inclined surface having an inclination angle of about 1 degree to about 45 degrees, preferably about 1 degree to about 20 degrees, relative to the vertical plane, thus improving the connection between any two of the metal ring 1, the ceramic ring 2 and the core column 3. The gap width between the metal ring 1 and the ceramic ring 2 may be regulated by utilizing their deadweight during soldering to ensure that the molten solder material may flow smoothly and the gap may be sufficiently filled with the solder material, thus avoiding incomplete filling of the solder material in the gap due to the non-uniform or improper gap width. Therefore, the soldering quality and yield rate may be enhanced greatly. Moreover, the shape of soldering surface of the sealing assembly is changed, thus increasing the soldering area and improving the peel strength. The sealing assembly according to embodiments of the present disclosure may have a stable structure, a high air impermeability and high peel strength.

The present disclosure will be described below in more detail with reference to examples.

EXAMPLE 1

This example is used to explain the sealing assembly for a positive electrode of a battery and the method for preparing the same.

Step 1, providing an alumina ceramic ring having a connecting hole therein, an Al—Mg alloy ring having a mounting hole therein and a Ti core column. The outer circumferential wall surface of the alumina ceramic ring was configured as an inclined surface having an inclination angle of about 5 degrees relative to the vertical plane, the inner circumferential wall surface of the Al—Mg alloy ring was also configured as an inclined surface having an inclination angle of about 5 degrees relative to the vertical plane. The outer circumferential wall surface of the Ti core column was configured as an inclined surface having an inclination angle of about 30 degrees relative to the vertical plane, the inner circumferential wall surface of alumina ceramic ring was also configured as an inclined surface having an inclination angle of about 30 degrees relative to the vertical plane.

Step 2, disposing the Ti core column 3 in the connecting hole of the alumina ceramic ring 2. A Ti—Cu—Ni soldering piece was disposed between the core column 3 and the ceramic ring 2, and then the assembled core column 3 and ceramic ring 2 were placed in a vacuum oven. The Ti core column 3 is soldered to the alumina ceramic ring 2 via soldering process. The soldering process is performed under 900° C. for 5 minutes. The outer circumferential wall surface of the Ti core column 3 is connected to the inner circumferential wall surface of alumina ceramic ring 2 tightly.

Then, the soldered core column 3 and ceramic ring 2 were disposed in the mounting hole of the Al—Mg alloy ring 1. An Al—Si soldering piece was disposed between the alumina ceramic ring 1 and the Al—Mg alloy ring 1. The alumina ceramic ring 2 was soldered to the Al—Mg alloy ring 1 via soldering process, the soldering process is carried out at 615° C. for 5 minutes under vacuum. The inner circumferential wall surface of the Al—Mg alloy ring 1 was connected to the outer circumferential wall surface of the alumina ceramic ring tightly to form a sealing assembly A1.

EXAMPLE 2

This example is used to explain the sealing assembly for a positive electrode of a battery and the method for preparing the same.

Step 1, providing a zirconia ceramic ring 2 having a connecting hole therein, an Al—Mg alloy ring 1 having a mounting hole therein and an Al core column 3. The outer circumferential wall surface of the zirconia ceramic ring 2 was configured as an inclined surface having an inclination angle of about 15 degrees relative to the vertical plane, the inner circumferential wall surface of the Al—Mg alloy ring 1 was also configured as an inclined surface having an inclination angle of about 15 degrees relative to the vertical plane. The outer circumferential wall surface of the Al core column 3 was configured as an inclined surface having an inclination angle of about 20 degrees relative to a vertical plane, the inner circumferential wall surface of zirconia ceramic ring 2 was also configured as an inclined surface having an inclination angle of about 20 degrees relative to the vertical plane.

Step 2, disposing the Al core column 3 in the connecting hole of the zirconia ceramic ring 2. An Al—Si soldering piece was disposed between the core column 3 and the ceramic ring 1, and then the assembled Al core column 3 and zirconia ceramic ring 2 were placed in a vacuum oven. The Al core column 3 was soldered to the alumina ceramic ring 2 via soldering process. The soldering process is performed under 600° C. for 5 minutes. The outer circumferential wall surface of the Al core column 3 was connected to the inner circumferential wall surface of zirconia ceramic ring tightly.

Then, the soldered zirconia ceramic ring 2 and Al core column 3 are disposed in the mounting hole of the Al—Mg alloy ring 1. An Al—Si soldering piece was disposed between the zirconia ceramic ring 2 and the Al—Mg alloy ring 1. The zirconia ceramic ring 2 was soldered to the Al—Mg alloy ring via soldering process, the soldering process is carried out at 615° C. for 5 minutes under vacuum. The inner circumferential wall surface of the Al—Mg alloy ring 1 was connected to the outer circumferential wall surface of the zirconia ceramic ring 2 tightly to form a sealing assembly A2.

EXAMPLE 3

This example is used to explain the sealing assembly for a negative electrode of a battery and the method for preparing the same.

Step 1, providing a zirconia ceramic ring 2 having a connecting hole therein, an Al—Mn alloy ring 1 having a mounting hole therein and a Ti core column 3. The outer circumferential wall surface of the zirconia ceramic ring 2 was configured as an inclined surface having an inclination angle of about 10 degrees relative to the vertical plane, the inner circumferential wall surface of the Al—Mn alloy ring 1 was also configured as an inclined surface having an inclination angle of about 10 degrees relative to the vertical plane. The outer circumferential wall surface of the Ti core column 3 was configured as an inclined surface having an inclination angle of about 10 degrees relative to the vertical plane, the inner circumferential wall surface of zirconia ceramic ring 2 was also configured as an inclined surface having an inclination angle of about 10 degrees relative to the vertical plane.

Step 2, disposing the Ti core column 3 in the connecting hole of the zirconia ceramic ring 2. A Ni—P soldering piece was disposed between the core column 3 and the ceramic ring 2, and then the assembled Ti core column 3 and zirconia ceramic ring 2 were placed in a vacuum oven. The Ti core column 3 was soldered to the zirconia ceramic ring 2 via soldering process. The soldering process is performed under 1000° C. for 3 minutes. The outer circumferential wall surface of the Ti core column 3 was connected to the inner circumferential wall surface of zirconia ceramic ring 2 tightly.

Then, the soldered zirconia ceramic ring 2 and Ti core column 3 were disposed in the mounting hole of the Al—Mn alloy ring 1. An Al—Si soldering piece was disposed between the alumina ceramic ring 2 and the Al—Mn alloy ring 1. The zirconia ceramic ring 2 was soldered to the Al—Mn alloy ring 1 via soldering process, the soldering process is carried out at 630° C. for 3 minutes under vacuum. The inner circumferential wall surface of the Al—Mn alloy ring 1 was connected to the outer circumferential wall surface of the zirconia ceramic ring 2 tightly to form a sealing assembly A3.

EXAMPLE 4

This example is used to explain the sealing assembly for a negative electrode of a battery and the method for preparing the same.

Step 1, providing an alumina-zirconia composite ceramic ring 2 having a connecting hole therein, an Al—Mn alloy ring 1 having a mounting hole therein and a Cu core column 3. The outer circumferential wall surface of the alumina-zirconia composite ceramic ring 2 was configured as an inclined surface having an inclination angle of about 15 degrees relative to the vertical plane, the inner circumferential wall surface of the Al—Mn alloy ring 1 was also configured as an inclined surface having an inclination angle of about 15 degrees relative to the vertical plane, and the inner circumferential wall surface of the alumina-zirconia composite ceramic ring 2 and the outer circumferential wall surface of the Cu core column 3 were configured as surfaces parallel to the vertical plane.

Step 2, disposing the Cu core column 3 in the connecting hole of the alumina-zirconia composite ceramic ring. A Cu—P soldering piece was disposed between the core column 3 and the ceramic ring 2, and then the assembled Cu core column 3 and alumina-zirconia composite ceramic ring 2 were placed in a vacuum oven. The Cu core column 3 is soldered to the alumina-zirconia composite ceramic ring 2 via soldering process. The soldering process is performed under 950° C. for 5 minutes. The outer circumferential wall surface of the Cu core column 3 is connected to the inner circumferential wall surface of alumina-zirconia composite ceramic ring 2 tightly.

Then, the soldered alumina-zirconia composite ceramic ring 2 and Cu core column 3 were disposed in the mounting hole of the Al—Mn alloy ring 1. An Al—Si soldering piece was disposed between the alumina-zirconia composite ceramic ring 2 and the Al—Mn alloy ring 1. The alumina-zirconia composite ceramic ring 2 was soldered to the Al—Mn alloy ring 1 via soldering process, and the soldering process was carried out at 615° C. for 3 minutes under vacuum. The inner circumferential wall surface of the Al—Mn alloy ring 1 was connected to the outer circumferential wall surface of the alumina-zirconia composite ceramic ring 2 tightly to form a sealing assembly A4.

EXAMPLE 5

This example is used to explain the sealing assembly for a negative electrode of a battery and the method for preparing the same.

Step 1, providing an alumina ceramic ring 2 having a connecting hole therein, an Al—Mg alloy ring 1 having a mounting hole therein and a Ni core column 3. The outer circumferential wall surface of the alumina ceramic ring 2 and the inner circumferential wall surface of the Al—Mg alloy ring 1 were configured as surfaces parallel to the vertical plane. The outer circumferential wall surface of the Ni core column 3 was configured as an inclined surface having an inclination angle of about 45 degrees relative to the vertical plane, and the inner circumferential wall surface of alumina ceramic ring 2 was also configured as an inclined surface having an inclination angle of about 45 degrees relative to the vertical plane.

Step 2, disposing the Ni core column 3 in the connecting hole of the alumina ceramic ring 2. A Ni—P soldering piece was disposed between the core column 3 and the ceramic ring 2, and then the assembled alumina ceramic ring 2 and Ni core column 3 were placed in a vacuum oven. The Ni core column 3 was soldered to the alumina ceramic ring 2 via soldering process. The soldering process was performed under 1000° C. for 5 minutes. The outer circumferential wall surface of the Ni core column 3 was connected to the inner circumferential wall surface of alumina ceramic ring 2 tightly.

Then, the soldered alumina ceramic ring 2 and Ni core column 3 were disposed in the mounting hole of the Al—Mg alloy ring 1. An Al—Si soldering piece was disposed between the alumina ceramic ring 2 and the Al—Mg alloy ring 1. The alumina ceramic ring 2 was soldered to the Al—Mg alloy ring 1 via soldering process, the soldering process was carried out at 600° C. for 5 minutes under vacuum. The inner circumferential wall surface of the Al—Mg alloy ring 1 was connected to the outer circumferential wall surface of the alumina ceramic ring 2 tightly to form a sealing assembly A5.

CONTROL EXAMPLE 1

This control example is used to explain the sealing assembly in the prior art.

The method for preparing the sealing assembly is similar to Example 1 except that that all of the inner circumferential wall surface of the metal ring, the outer circumferential wall surface of the ceramic ring, the inner circumferential wall surface of the ceramic ring and the outer circumferential wall surface of the core column are configured as vertical planes. The sealing assembly is referred as D1.

Testing

The sealing assemblies A1-A5 and D1 were placed in cold water having a temperature lower than 0° C. for 3 minutes, then, the sealing assemblies were quickly transferred into boiling water having a temperature higher than 100° C. for 3 minutes, thus carrying out the cold-thermal shock test of the sealing assembles once. The cold-thermal shock test was repeated for a predetermined times for the sealing assemblies A1-A5 and D1, then the air impermeability is tested with respect to each of the sealing assemblies A1-A5 and D1.

The method for testing air impermeability was as the following: firstly, the sealing assembly was placed in a closed cavity of a clamp, while the connection parts of the sealing assembly were exposed out of the cavity. The air pressure of the cavity was maintained at about 0.6 MPa for 3 minutes. Then, water was dropped on the connection parts of the sealing assembly for testing the air impermeability thereof. If bubbles appeared, it means that the sealing assembly is air-leaking; if no bubbles appeared, it means that the sealing assembly is no air-leaking and meets the requirements of air impermeability.

The results were recorded in Table 1.

TABLE 1

|  | Performance |
| --- | --- |
| A1 | 500 times, no air-leaking |
| A2 | 500 times, no air-leaking |
| A3 | 500 times, no air-leaking |
| A4 | 400 times, no air-leaking; 500 times, leaking |
| A5 | 400 times, no air-leaking; 500 times, leaking |
| D1 | 300 times, leaking |

As shown in Table 1, after 400 times of cold-thermal shock test, the sealing assemblies A1-A5 can still meet the requirements of air impermeability. These suggest that the connection of the sealing assemblies A1-A5 is reliable, and the sealing effect is good. Since the sealing assemblies A4 and A5 had soldering surfaces parallel to the vertical plane, the sealing effect of the sealing assemblies A1-A3 was better than that of the sealing assembly A4 and A5.

Although explanatory embodiments have been shown and described, it would be appreciated by those skilled in the art that the above embodiments may not be construed to limit the present disclosure, and changes, alternatives, and modifications may be made in the embodiments without departing from spirit, principles and scope of the present disclosure.

What is claimed is:

1. A sealing assembly, comprising:
a metal ring having a mounting hole therein;
a ceramic ring having a connecting hole therein and disposed in the mounting hole; and
a core column disposed in the connecting hole,
wherein each of an inner circumferential wall surface of the metal ring, an outer circumferential wall surface of the ceramic ring, an inner circumferential wall surface of the ceramic ring and an outer circumferential wall surface of the core column is configured as an inclined surface so that the metal ring is configured to be soldered to the ceramic ring and the ceramic ring is configured to be soldered to the core column, and an inclination angle of the inclined surface relative to a vertical plane is about 2 degrees to about 30 degrees,
wherein a second soldering layer is disposed between the inner circumferential wall surface of the ceramic ring and the outer circumferential wall surface of the core column,
wherein when the sealing assembly is configured as a sealing assembly for at least one of a positive electrode and a negative electrode of a battery, the core column is made of Ti and the second soldering layer is formed by a Ti-based solder material,
wherein the Ti-based solder material comprises Ti, and at least one of Zr, Ni, and Cu.

2. The sealing assembly of claim 1, wherein the inner circumferential wall surface of the metal ring and the outer circumferential wall surface of the ceramic ring form a first pair of jointing surfaces, the inner circumferential wall surface of the ceramic ring and the outer circumferential wall surface of the core column form a second pair of jointing surfaces, both the first and second pairs of jointing surfaces are configured as the inclined surface.

3. The sealing assembly of claim 1, wherein a first soldering layer is disposed between the inner circumferential wall surface of the metal ring and the outer circumferential wall surface of the ceramic ring.

4. The sealing assembly of claim 3, wherein the first soldering layer is formed by an Al-based solder material comprising Al and at least one of Si and Mg.

5. The sealing assembly of claim 1, wherein the ceramic ring is made of a material that remains solid at a soldering temperature of at least 580° C.

6. A method for preparing a sealing assembly, comprising steps of:
preparing a metal ring having a mounting hole therein, a ceramic ring having a connecting hole therein, and a core column;
disposing the core column in the connecting hole of the ceramic ring; and
disposing the ceramic ring in the mounting hole of the metal ring,
wherein each of an inner circumferential wall surface of the metal ring, an outer circumferential wall surface of the ceramic ring, an inner circumferential wall surface of the ceramic ring and an outer circumferential wall surface of the core column is configured as an inclined surface so that the metal ring is soldered to the ceramic ring and the ceramic ring is soldered to the core column, and an inclination angle of the inclined surface relative to a vertical plane is about 2 degrees to about 30 degrees,
wherein a soldering layer is disposed between the inner circumferential wall surface of the ceramic ring and the outer circumferential wall surface of the core column,
wherein when the sealing assembly is configured as a sealing assembly for at least one of a positive electrode and a negative electrode of a battery, the core column is made of Ti and the soldering layer is formed by a Ti-based solder material,
wherein the Ti-based solder material comprises Ti, and at least one of Zr, Ni, and Cu,
wherein the ceramic ring is mounted in the mounting hole of the metal ring via a first soldering process,
wherein the first soldering process is performed at a temperature of about 580 to about 630° C. for about 1 minute to about 5 minutes under vacuum or an inert gas and is performed by using a solder material.

7. The method of claim 6, wherein the inner circumferential wall surface of the metal ring and the outer circumferential wall surface of the ceramic ring form a first pair of jointing surfaces, the inner circumferential wall surface of the ceramic ring and the outer circumferential wall surface of the core column form a second pair of jointing surfaces, both the first and second pairs of jointing surfaces are configured as the inclined surface.

8. The method of claim 6, wherein the core column is mounted in the connecting hole of the ceramic ring via a second soldering process.

9. The method of claim 8, wherein the second soldering process is performed at a temperature lower than a melting point of the core column for about 1 minute to about 10 minutes under vacuum or an inert gas.

10. The method of claim 6, wherein a gap width between the core column and the ceramic ring is adjusted by a deadweight of the core column and the ceramic ring during soldering.

11. A battery, comprising:
  a shell having at least one open end;
  an electrode core and electrolyte solution received in the shell; and
  at least one sealing assembly configured to seal the at least one open end of the shell,
  wherein the sealing assembly comprises:
    a metal ring having a mounting hole therein,
    a ceramic ring having a connecting hole therein and disposed in the mounting hole,
    a core column disposed in the connecting hole,
    wherein each of an inner circumferential wall surface of the metal ring, an outer circumferential wall surface of the ceramic ring, an inner circumferential wall surface of the ceramic ring and an outer circumferential wall surface of the core column is configured as an inclined surface so that the metal ring is soldered to the ceramic ring and the ceramic ring is soldered to the core column, and an inclination angle of the inclined surface relative to a vertical plane is about 2 degrees to about 30 degrees, wherein a second soldering layer is disposed between the inner circumferential wall surface of the ceramic ring and the outer circumferential wall surface of the core column,
  wherein when the sealing assembly is configured as a sealing assembly for at least one of a positive electrode and a negative electrode of a battery, the core column is made of Ti and the second soldering layer is formed by a Ti-based solder material,
  wherein the Ti-based solder material comprises Ti, and at least one of Zr, Ni, and Cu; and
wherein the metal ring of the sealing assembly is connected with the shell and the core column is connected with the electrode core.

* * * * *